United States Patent
Tanaka

(10) Patent No.: US 9,234,818 B2
(45) Date of Patent: Jan. 12, 2016

(54) COMBUSTION CONTROL DEVICE FOR GAS ENGINE

(71) Applicant: MITSUBISHI HEAVY INDUSTRIES, LTD., Tokyo (JP)

(72) Inventor: Kengo Tanaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/367,051

(22) PCT Filed: Dec. 6, 2012

(86) PCT No.: PCT/JP2012/081643
§ 371 (c)(1),
(2) Date: Jun. 19, 2014

(87) PCT Pub. No.: WO2013/099552
PCT Pub. Date: Jul. 4, 2013

(65) Prior Publication Data
US 2014/0366842 A1    Dec. 18, 2014

(30) Foreign Application Priority Data
Dec. 28, 2011 (JP) ................................ 2011-289213

(51) Int. Cl.
*F02M 7/00*   (2006.01)
*G01M 15/08*  (2006.01)
(Continued)

(52) U.S. Cl.
CPC .............. *G01M 15/08* (2013.01); *F02D 19/02* (2013.01); *F02D 35/023* (2013.01);
(Continued)

(58) Field of Classification Search
CPC ..... F02D 35/023; F02D 37/02; F02D 35/028; F02D 41/2441; F02D 41/2451; F02D 41/2445; Y02T 10/46; Y02T 10/40; F02P 5/153; F02P 2017/128
USPC ......... 123/435, 434, 679, 674, 673, 691, 692, 123/406.11, 406.21, 406.17, 406.16, 406.2, 123/406.22, 406.33, 46.39; 701/101–105, 701/110, 111; 73/35.01, 35.04, 35.06, 73/114.01, 114.16, 114.17, 114.18
See application file for complete search history.

(56) References Cited

U.S. PATENT DOCUMENTS

| | | | |
|---|---|---|---|
| 4,409,937 A | 10/1983 | Asano | |
| 4,825,832 A * | 5/1989 | Satoh | F02P 5/1521 123/406.21 |

(Continued)

FOREIGN PATENT DOCUMENTS

| | | |
|---|---|---|
| DE | 19536168 A1 | 4/1997 |
| JP | 1-100328 A | 4/1989 |

(Continued)

OTHER PUBLICATIONS

International Preliminary Report on Patentability and Written Opinion of the International Searching Authority (Forms PCT/IB/326, PCT/IB/373, PCT/IB/338 and PCT/ISA/273) and English translation thereof, dated Jul. 10, 2014, for International Application No. PCT/JP2012/081643.

(Continued)

*Primary Examiner* — Lindsay Low
*Assistant Examiner* — Long T Tran
(74) *Attorney, Agent, or Firm* — Birch, Stewart, Kolasch & Birch, LLP

(57) ABSTRACT

To improve output and thermal efficiency of a gas engine by advancing the ignition timing to a maximum extent while knocking is suppressed, in the plurality of cylinders, by a simple and low-cost means, in a first calculation part 32, a knocking limit ignition timing Tia of a representing cylinder 14a is calculated based on an in-cylinder pressure waveform. In a second calculation part 34, a knocking limit ignition timing Tia' of the representing cylinder 14a is calculated by substituting an operation state quantity and a basic engine specification value into a formula (1). In a third calculation part 36, the knocking limit ignition timings Tia and Tia' are compared to obtain a correction factor C. In a fourth calculation part 38, based on the obtained correction factor C, the knocking limit ignition timings Tib-Tif of cylinders other than the representing cylinder 14a are calculated. In the fourth calculation part 38, the correction factor C of each of the cylinder is preferably modified based on test data obtained from a test machine of the same type as a gas engine 10.

4 Claims, 5 Drawing Sheets

(51) Int. Cl.
*F02P 5/152* (2006.01)
*F02P 5/153* (2006.01)
*F02D 19/02* (2006.01)
*F02M 35/10* (2006.01)
*F02D 35/02* (2006.01)
*F02D 41/00* (2006.01)
*F02P 5/04* (2006.01)
*F02B 29/04* (2006.01)

(52) U.S. Cl.
CPC ......... *F02D 35/027* (2013.01); *F02D 41/0027* (2013.01); *F02M 35/1038* (2013.01); *F02P 5/04* (2013.01); *F02P 5/152* (2013.01); *F02P 5/153* (2013.01); *F02B 29/0406* (2013.01); *Y02T 10/32* (2013.01); *Y02T 10/46* (2013.01)

(56) References Cited

U.S. PATENT DOCUMENTS

| | | | |
|---|---|---|---|
| 4,860,711 A | | 8/1989 | Morikawa |
| 4,946,241 A | * | 8/1990 | Krumme ............... C23C 14/08 204/192.15 |
| 5,276,625 A | | 1/1994 | Nakaniwa |
| 6,062,199 A | | 5/2000 | Entenmann et al. |
| 7,021,286 B2 | * | 4/2006 | Yoshino ............... F02D 35/025 123/406.29 |
| 7,051,712 B2 | * | 5/2006 | Kantschar ............ F02D 35/027 23/406.29 |
| 7,222,606 B2 | * | 5/2007 | Yoshino ............... F02P 5/152 123/406.37 |
| 8,191,532 B2 | * | 6/2012 | Folkerts ............... F02D 35/023 123/406.11 |
| 2004/0159309 A1 | | 8/2004 | Nagaishi et al. |
| 2007/0277780 A1 | * | 12/2007 | Akazaki ............... F02D 35/028 123/406.22 |
| 2007/0277781 A1 | | 12/2007 | Machida et al. |
| 2010/0242912 A1 | * | 9/2010 | Folkerts ............... F02D 35/023 123/435 |
| 2011/0282562 A1 | | 11/2011 | Yoshiri et al. |
| 2011/0307163 A1 | * | 12/2011 | Kato ................... F02D 13/0265 701/104 |

FOREIGN PATENT DOCUMENTS

| | | |
|---|---|---|
| JP | 8-135482 A | 5/1996 |
| JP | 2000-509790 A | 8/2000 |
| JP | 2002-61524 A | 2/2002 |
| JP | 2004-245173 A | 9/2004 |
| JP | 2005-315128 A | 11/2005 |
| JP | 2010-185326 A | 8/2010 |
| JP | 2011-12569 A | 1/2011 |

OTHER PUBLICATIONS

International Search Report (Forms PCT/ISA/220 and PCT/ISA/210), dated Jan. 15, 2013, for International Application No. PCT/JP2012/081643.
Japanese Decision to Grant, issued Oct. 9, 2015, for Japanese Application No. 2011-289213, along with an English translation.
Chinese Office Action, issued Oct. 23, 2015 in corresponding Chinese Application No. 201280062587.8 (with English translation).

* cited by examiner

Related Art

COMBUSTION CONTROL DEVICE FOR GAS ENGINE

TECHNICAL FIELD

The present invention relates to a combustion control device for a gas engine capable of setting a knocking limit ignition timing with respect to each cylinder with a low-cost means and improving the engine output or the fuel consumption.

BACKGROUND

In a gas engine, since a flame propagates in a mixture gas of a gas fuel and air, knocking is more likely to occur relative to a diesel engine in which injection of fuel and ignition take place almost at the same time. In order to improve output or fuel consumption of the gas engine, it is necessary to advance the ignition timing; however, advance of the ignition timing is limited by knocking.

Further, as illustrated in FIG. 6, as the output is increased, knocking is more likely to occur, and the range where the ignition timing can be advanced. The chart of FIG. 7 indicates that as the supply air temperature increases, the knocking frequency becomes high. Thus, in order not to let the knocking frequency exceed a threshold value, it is necessary to lower the supply air temperature and to retard the ignition timing. On the other hand, as the combustion state or the likelihood of knocking differs depending on the cylinders, it is necessary to set the knocking limit ignition timing of the maximum advance at which knocking does not occur, with respect to each cylinder, depending upon the likelihood of knocking.

Patent Document 1 discloses an internal combustion engine comprising a plurality of cylinders, having a means for controlling prevention of knocking for each cylinder by adjusting the ignition timing. In this means, knocking is detected by a knock sensor to detect a vibrational state of the cylinder.

Patent Document 2 discloses a variable compression ratio engine having a means for detecting occurrence of knocking by an in-cylinder pressure sensor and controlling the compression ratio and the ignition timing to prevent knocking, as well as to improve the thermal efficiency and the drivability. Patent Document 3 discloses a gas engine comprising a plurality of cylinders, having a means for detecting a state of knocking (intensity or frequency) which is different depending on the cylinders by measuring an in-cylinder pressure waveform a knocking sensor (e.g. an in-cylinder pressure sensor) provided for each of the cylinders, and changing the air-fuel ratio and the ignition timing based on such a detected value, in order to obtain at least a prescribed value of thermal efficiency without knocking.

In a gas engine comprising a plurality of cylinders, a combustion control device for detecting an in-cylinder pressure waveform by an in-cylinder pressure sensor provided for each cylinder and setting a knocking limit ignition timing may have a configuration as illustrated in FIG. 8, for example. In FIG. 8, a gas engine 100 has six cylinders 104a-104f in a row in an engine block 102. Each of the cylinders 104a-104f has an in-cylinder pressure sensor 106. Into each of the cylinders 104a-104f, supply air 'a' is flown from an air cooler 108 via an intake manifold 110. Exhaust gas 'e' after combustion in the cylinders 104a-104f is gathered through an exhaust manifold 112 in an exhaust pipe 114, and then is exhausted from the exhaust pipe 114.

On a crankshaft of the engine block 102, a rotation sensor 116 configured to detect a crank angle including the top dead center and the bottom dead center, is provided. An in-cylinder pressure waveform P corresponding to the crank angle is detected by the in-cylinder pressure sensor 106 and the rotation sensor 116. According to a change of the in-cylinder pressure during a cycle, the frequency of knocking and the knocking limit ignition timing are derived. If the ignition timings for all of the cylinders are the same, knocking occurrence may become unsynchronized. By detecting in-cylinder pressures of all of the cylinders, retarding the ignition timings for cylinders in which knocking is likely to occur, and advancing the ignition timings for cylinders in which knocking is unlikely to occur, the ignition timings can be advanced to a maximum extent while knocking is suppressed in all of the cylinders.

CITATION LIST

Patent Literature

Patent Document 1: JP 2011-12569 A
Patent Document 2: JP H1-100328 A
Patent Document 3: JP 2002-61524 A

SUMMARY

Technical Problem

However, since the in-cylinder pressure sensors are expensive, providing an in-cylinder pressure sensors for each of the cylinder leads to a high cost when the number of the cylinder is large. Further, there is also a problem that the probability of failure or malfunction of the in-cylinder pressure sensors may become high.

In view of the above problem, the present invention is to improve the output and thermal efficiency of a gas engine having a plurality of cylinders by advancing the ignition timing to a maximum extent in each of the plurality of cylinders while knocking is suppressed in the plurality of cylinders by a simple and low-cost means.

Solution to Problem

In order to accomplish such an object, the present invention provides a combustion control device for a gas engine having a plurality of cylinders, comprising:

an in-cylinder pressure sensor configured to detect an in-cylinder pressure of a representing cylinder selected from among the plurality of cylinders, a first calculation part for calculating a knocking limit ignition timing of the representing cylinder based on an in-cylinder pressure waveform detected by the in-cylinder pressure sensor, a second calculation part for calculating a knocking limit ignition timing of the representing cylinder from a formula containing an operation state quantity other than the in-cylinder pressure waveform, a basic engine specification value and a correction factor, a third calculation part for calculating the correction factor by comparing the knocking limit ignition timing of the representing cylinder calculated by the first calculation part and the knocking limit ignition timing of the representing cylinder calculated by the second calculation part, a fourth calculation part for calculating a knocking limit ignition timing of a cylinder among the plurality of cylinders other than the representing cylinder by substituting the calculated correction factor, the operation state quantity and the basic engine specification value, into the formula, and an ignition timing setting part for setting a knocking limit ignition timing of the each of the plurality of cylinders based on the knocking limit ignition timings of all of the cylinders calculated by the first calculation part and the fourth calculation part.

According to the present invention, instead of providing an in-cylinder pressure sensor for each of the cylinder, an in-cylinder pressure sensor is provided only for a selected representing cylinder. Since in other cylinders, the knocking limit ignition timing is calculated from another operation state quantity and a basic engine specification value without an in-cylinder pressure sensor provided, it is possible to reduce cost. Further, the knocking limit ignition timing can be calculated for each of the plurality of cylinders from the in-cylinder pressure waveform detected by the in-cylinder pressure sensor and the operation state quantity detected by each of the plurality of cylinders. Thus, it is possible to perform an operation where the fuel consumption and the thermal efficiency are good at a low cost.

The operation state quantity may be a temperature of supply air supplied to the each of the plurality of cylinders, an air excess ratio or an engine rotational speed. It is thereby possible to reduce sensors provided for the gas engine and reduce cost. The basic engine specification value may be a cylinder bore, a stroke, a compression ratio or a connecting rod length. By adopting such a factor as the basic engine specification, it is possible to accurately calculate the knocking limit ignition timing of each of the plurality of cylinders.

The fourth calculation part may be configured to modify the correction factor for each of the plurality of cylinders based on a preliminarily obtained operation test data of the gas engine. It is thereby possible to more accurately calculate the knocking limit ignition timing of each of the plurality of cylinders.

According to the present invention, based on the knocking limit ignition timing of the representing cylinder, the knocking limit ignition timings of cylinders other than the representing cylinder are calculated. Thus, a cylinder in which knocking is most likely to occur among the plurality of cylinders may be selected as the representing cylinder, whereby it is possible to advance the ignition timing from an operation state on a safe side where knocking is certainly suppressed and to adjust it to the knocking limit ignition timing.

Advantageous Effects

According to the present invention, by a low-cost means where an in-cylinder pressure sensor is provided only for a selected representing cylinder instead of providing an in-cylinder pressure sensor for each of the cylinder, the knocking limit ignition timing of each of the plurality of cylinders can be calculated for each of the plurality of cylinders from the in-cylinder pressure waveform of the representing cylinder, and the operation state quantity and the basic engine specification value of each of the plurality of cylinders. Thus, it is possible to advance the ignition timing to a maximum extent while knocking is suppressed in each of the plurality of cylinders and thereby to improve the output and thermal efficiency of the gas engine.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Figure 1:
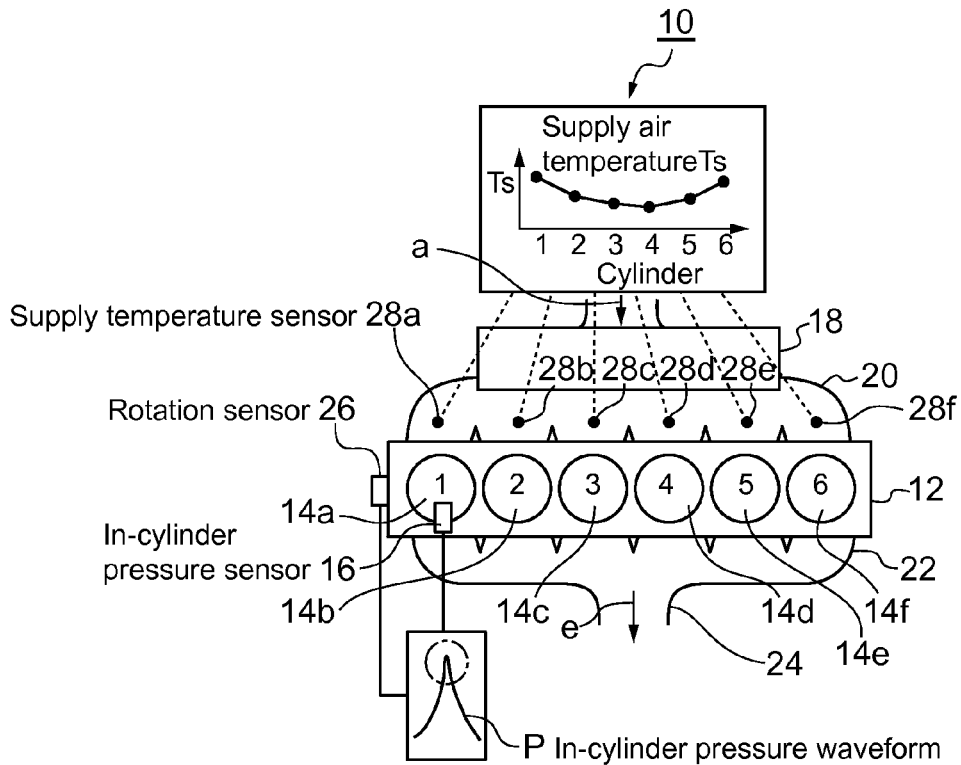
FIG. 1 is a configuration diagram of a gas engine according to an embodiment of the present invention.

An embodiment where the present invention is applied to a combustion control of a gas engine will be described with reference to FIG. 1 to FIG. 4. As illustrated in FIG. 1, a gas engine 10 according to this embodiment has six cylinders 14a-14f in a row in an engine block 12. Among the cylinders 14a-14f, the leftmost cylinder 14a is selected as a representing cylinder. The cylinder 14a is provided with an in-cylinder pressure sensor 16. Into each of the cylinders 14a-14f, a supply air 'a' is flown from an air cooler 18 via an intake manifold 20. An exhaust gas 'e' after combustion in each of the cylinders 14a-14f is gathered into an exhaust pipe 24 via an exhaust manifold 22, and then is exhausted from the exhaust pipe 24.

On a crankshaft (not shown) of the engine block 12, a rotation sensor 26 configured to detect a crank angle including a top dead center and a bottom dead center, is provided. An in-cylinder pressure waveform P corresponding to the crank angle is detected by the in-cylinder pressure sensor 16 and the rotation sensor 26. Based on a change of the in-cylinder pressure during each cycle, the knocking occurrence frequency and the knocking limit ignition timing are derived. Supply air temperature sensors 28a-28f are provided at the inlets of the respective cylinders 14a-14f. As illustrated in FIG. 1, the supply air temperatures Ts of the intake air into the respective cylinders 14a-14f are different. The supply air temperatures Ts of the cylinder 14a and the cylinder 14f at the both ends of the row of the cylinders are the highest, and the supply air temperatures Ts of the cylinder 14c and the cylinder 14d at the center are the lowest.

In the air cooler 18 or the intake manifold 20, since the supply air tends to remain at the both ends, the wall temperature is likely to be high. Thus, the temperatures Ts of the supply air flown into the cylinder 14a and the cylinder 14f disposed at the both ends of the engine block 12 are most likely to be high. Therefore, knocking becomes likely to occur in the cylinders disposed at the both ends of the engine block 12. In this embodiment, the leftmost cylinder 14a is selected as the representing cylinder.

Figure 2:
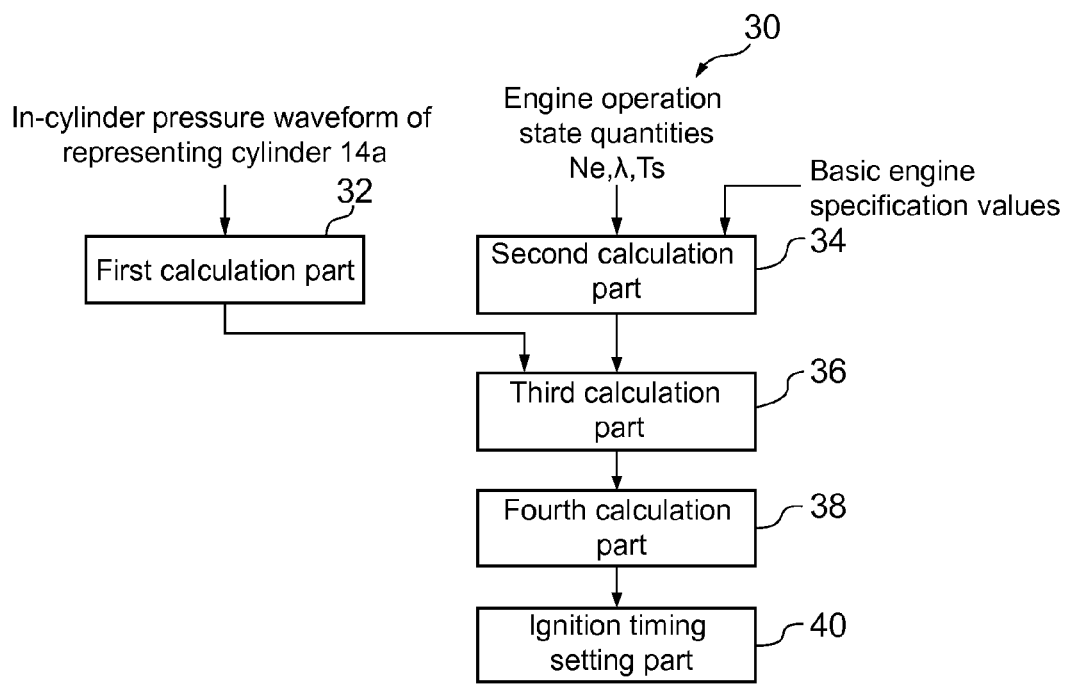
FIG. 2 is a block diagram illustrating a combustion control device according to the above embodiment.

FIG. 2 illustrates a combustion control device 30 of the gas engine 10. As illustrated in FIG. 2, an in-cylinder pressure waveform of the representing cylinder 14a detected by the in-cylinder pressure sensor 16 is input into a first calculation part 32. In the first calculation part 32, a knocking limit ignition timing of the representing cylinder 14a is calculated based on the in-cylinder pressure waveform. In the second calculation part 34, a knocking limit ignition timing of the representing cylinder 14a is calculated from the following formula (1) containing an operation state quantity, a basic engine specification value and a correction factor C:

$$Ti = f(C, B, S, \epsilon, CR, Ne, \lambda, Ts) \quad (1)$$

where C is correction factor; B is cylinder bore, S is stroke, $\epsilon$ is compression ratio, and CR is connecting rod length, which are basic engine specification values; and Ne is engine rotational speed, $\lambda$ is air excess ratio, and Ts is supply air temperature, which are operation state quantities.

The engine rotational speed Ne is detected by the rotation sensor 26, and the supply air temperature is detected for each of the cylinders by each of the sensors 28a-28f. Regarding the air excess ratio $\lambda$, it is preferred to confirm whether the air excess ratio $\lambda$ is as set, by an oxygen concentration sensor provided on an exhaust passage. In a case where a gas fuel is supplied before the compressor, it is enough to provide one oxygen concentration sensor in the exhaust pipe 24 because there will be no variation among the cylinders.

In the third calculation part 36, the knocking limit ignition timing of the representing cylinder 14a calculated by the first calculation part 32 and the knocking limit ignition timing of the representing cylinder 14a calculated by the second calculation part 34 are compared, to obtain a correction factor C. In the fourth calculation part 38, based on the correction factor C obtained by the third calculation part 36, the operation state quantity and the basic engine specification value are substituted into the formula (1) for each of the cylinders to calculate the knocking limit ignition timing of each of the cylinders other than the representing cylinder 14a. In the ignition timing setting part 40, a knocking limit ignition timing of an ignition device (not shown) of each of the cylinders is set based on the calculated knocking limit ignition timing of each of the cylinders.

Figure 3:
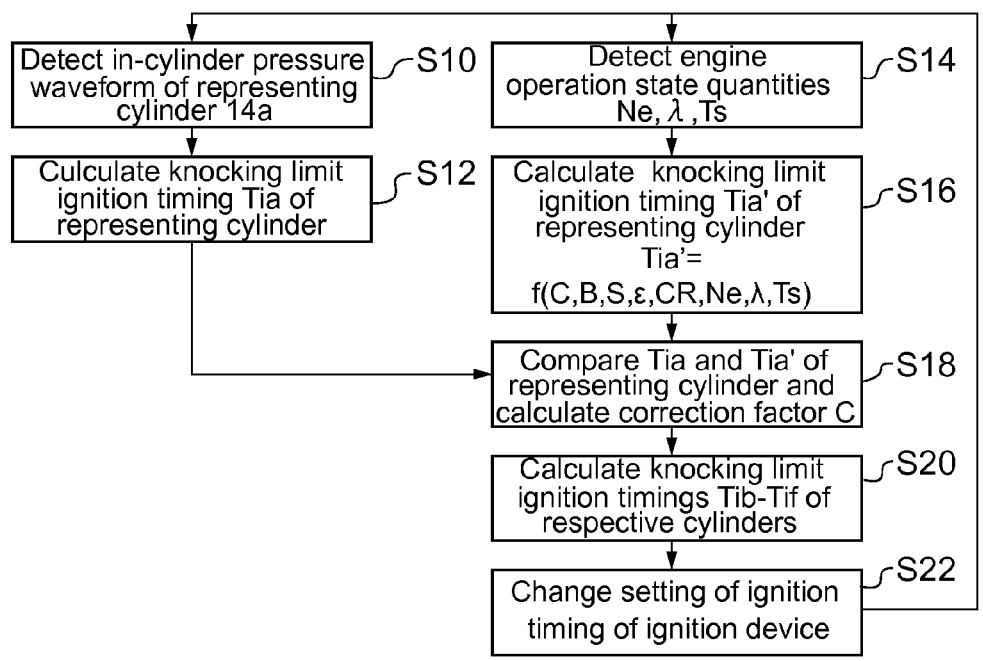
FIG. 3 is a flowchart illustrating a procedure of a combustion control according the above embodiment.

FIG. 3 is a flowchart illustrating a procedure of setting a knocking limit ignition timing by the control device 30. As illustrated in FIG. 3, first, an in-cylinder pressure waveform of the representing cylinder 14a is detected by the in-cylinder pressure sensor 16 (S10). Then, in the first calculation part 32, a knocking limit ignition timing Tia of the representing cylinder 14a is calculated based on the detected in-cylinder pressure waveform (S12). Meanwhile, as described above, as the operation state quantities, an engine rotational speed Ne, an air excess ratio $\lambda$, and a supply air temperature Ts of each of the cylinders obtained by sensors provided for the gas engine 10, are selected (S14). These operation state quantities and the basic engine specification values are input into the second calculation part 34. In the second calculation part 34, a knocking limit ignition timing Tia' of the representing cylinder 14a is calculated from the formula (1) (S16).

Then, in the third calculation part 36, the knocking limit ignition timing Tia calculated by the first calculation part 32 and the knocking limit ignition timing Tia' calculated by the second calculation part 34 are compared to calculate a correction factor C (S18). That is, the knocking limit ignition timing Tia, and the operation state quantities and the basic engine specification values are substituted into the formula (1) to obtain the correction factor C. Then, based on the obtained correction factor C, and the operation state quantities and the basic engine specification values of each of the cylinders, knocking limit ignition timings Tib-Tif are calculated from the formula (1) (S20). Operation test data of a test machine of the same type as the gas engine 10 are obtained in advance. Based on the test data, the correction factor C is modified for each of the cylinders. Based on the modified correction factor C, knocking limit ignition timings Tib-Tif are calculated.

Figure 4:
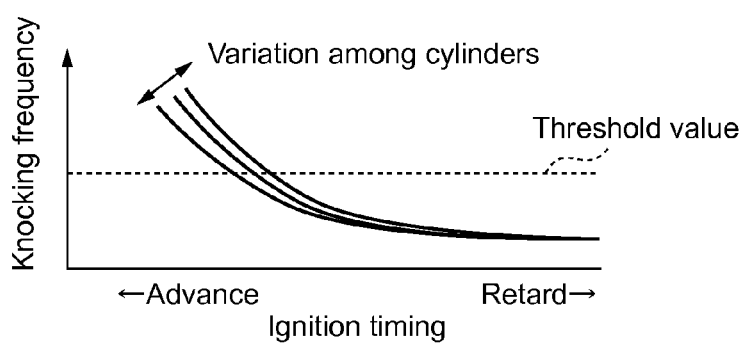
FIG. 4 is a chart showing variation in knocking frequencies among cylinders of an gas engine.
Figure 5:
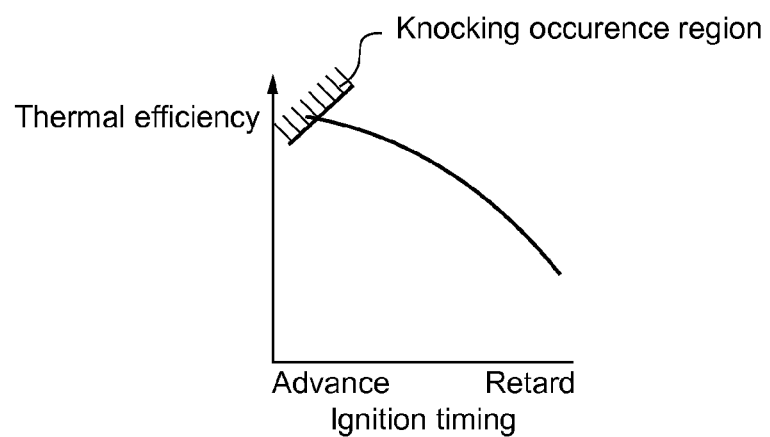
FIG. 5 is a chart showing a relationship between an ignition timing and a thermal efficiency of a gas engine.
Figure 6:
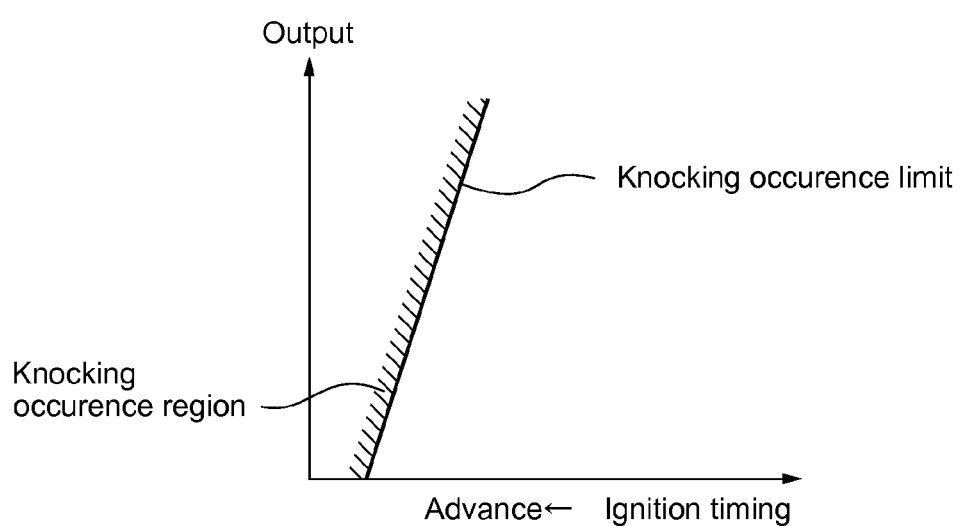
FIG. 6 is a chart showing a relationship between an output and a rotational speed at an ignition timing and a knocking occurrence limit, of a gas engine.
Figure 7:
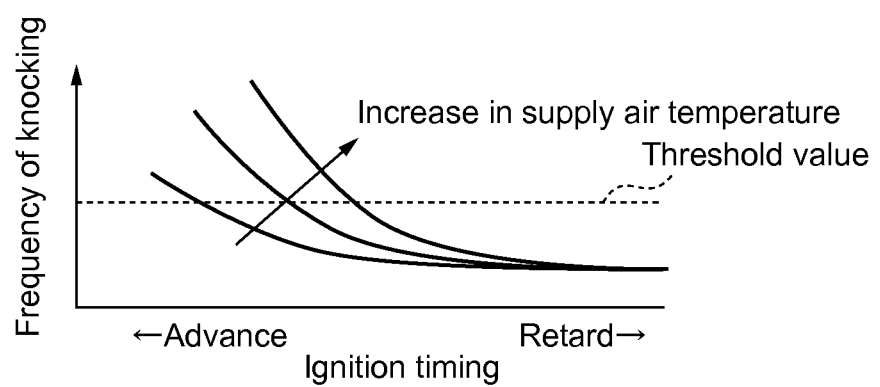
FIG. 7 is a chart showing a relationship between a supply air temperature and a knocking frequency of a gas engine.
Figure 8:
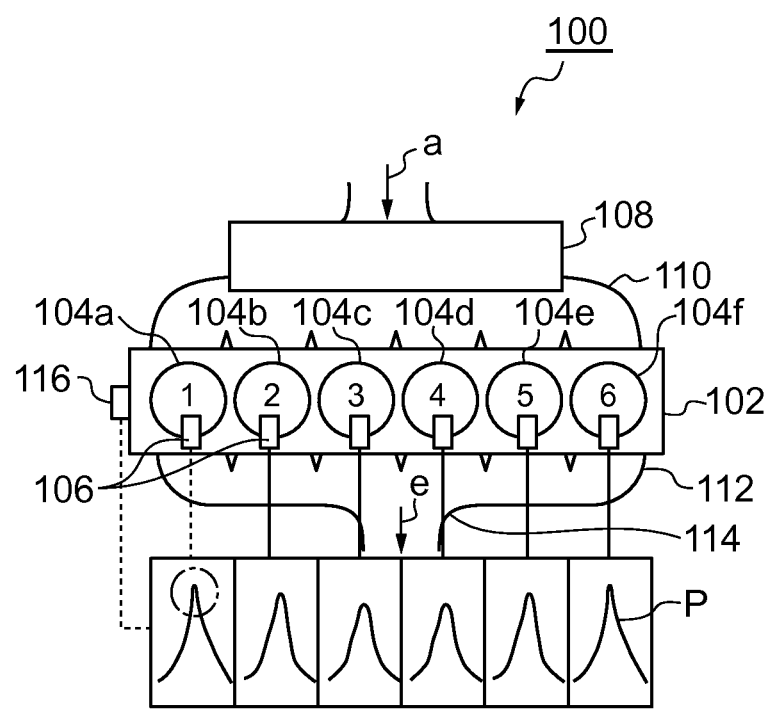
FIG. 8 is a configuration diagram of a combustion control device of a gas engine in a case of an in-cylinder pressure sensor is provided for each cylinder (related art).

FIG. 4 is a chart showing variation in knocking frequencies among cylinders of an gas engine, obtained based on test data of a test machine under a condition of a constant supply air temperature. For example, the knocking frequencies are varied among the cylinders due to difference in the supply air temperatures Ts. However, even if the supply air temperatures Ts are actually the same among the cylinders, the knocking frequencies may be varied among the cylinders due to difference in the temperatures of wall surface of combustion chambers of the respective cylinders. Thus, in order to calculate an accurate knocking limit ignition timing for each of the cylinders, the correction factor C may be modified for each of the cylinders.

Based on the knocking limit ignition timings of the respective cylinders 14a-14f calculated as above, ignition timings of the respective cylinders 14a-14f of the ignition device are set by the ignition timing setting part 40. In this way, the ignition timings of the respective cylinders are changed on a real time basis while the in-cylinder pressure waveform of the representing cylinder 14a and another operation quantity are detected from moment to moment.

According to this embodiment, it is enough to provide the in-cylinder pressure sensor 16 only for the selected representing cylinder 14a, and the knocking limit ignition timing is calculated without providing in-cylinder pressure sensors for other cylinders 14b-14f, whereby it is possible to reduce cost. Further, the knocking limit ignition timing of each of the cylinder is calculated based on the in-cylinder pressure waveform of the representing cylinder 14a detected by the in-cylinder pressure sensor 16, and another operation state quantity detected for each of the cylinders and the basic engine specification value, whereby it is possible to perform operation where the thermal efficiency is good.

Further, since the correction factor C is modified for each of the cylinders based on operation test data preliminarily obtained from a test machine of the same type as the gas engine 10, it is possible to calculate an accurate knocking limit ignition timing of each of the cylinders. Further, since the cylinder 14a in which the supply air temperature Ts is the highest and knocking is most likely to occur, is selected as the representing cylinder, and the knocking limit ignition timings of the other cylinders are calculated based on the knocking limit ignition timing of the cylinder 14a, it is possible to advance the ignition timing from an operation state on a safe side and to adjust it to the knocking limit ignition timing, and it is possible to certainly suppress knocking.

INDUSTRIAL APPLICABILITY

According to the present invention, it is possible to advance the ignition timing to a maximum extent while knocking is suppressed, in each of the plurality of cylinders, and thereby to improve the output and thermal efficiency of a gas engine, by a simple and low-cost means.

The invention claimed is:
1. A combustion control device for a gas engine having a plurality of cylinders, comprising:
    an in-cylinder pressure sensor configured to detect an in-cylinder pressure of a representing cylinder selected from among the plurality of cylinders, a first calculation part for calculating a knocking limit ignition timing of the representing cylinder based on an in-cylinder pressure waveform detected by the in-cylinder pressure sensor, a second calculation part for calculating a knocking limit ignition timing of the representing cylinder from a formula containing an operation state quantity other than the in-cylinder pressure waveform, a basic engine specification value and a correction factor, a third calculation part for calculating the correction factor by comparing the knocking limit ignition timing of the representing cylinder calculated by the first calculation part and the knocking limit ignition timing of the representing cylinder calculated by the second calculation part, a fourth calculation part for calculating a knocking limit ignition timing of a cylinder among the plurality of cylinders other than the representing cylinder by substituting the calculated correction factor, the operation state quantity and the basic engine specification value, into the formula, and an ignition timing setting part for setting a knocking limit ignition timing of the each of the plurality of cylinders based on the knocking limit ignition timings of all of the cylinders calculated by the first calculation part and the fourth calculation part.

2. The combustion control device for a gas engine according to claim 1, wherein the operation state quantity includes a temperature of supply air supplied to the each of the plurality of cylinders, an air excess ratio or an engine rotational speed, and the basic engine specification value includes a cylinder bore, a stroke, a compression ratio or a connecting rod length.

3. The combustion control device according to claim 1, wherein the fourth calculation part is configured to modify the correction factor for each of the plurality of cylinders based on a preliminarily obtained operation test data of the gas engine.

4. The combustion control device according to claim 1, wherein a cylinder in which knocking is most likely to occur among the plurality of cylinders is selected as the representing cylinder.

* * * * *